June 4, 1935.  H. J. MARLOWE  2,003,299
DEVICE FOR CUTTING AND PRESSING VEGETABLES AND THE LIKE
Filed March 24, 1932
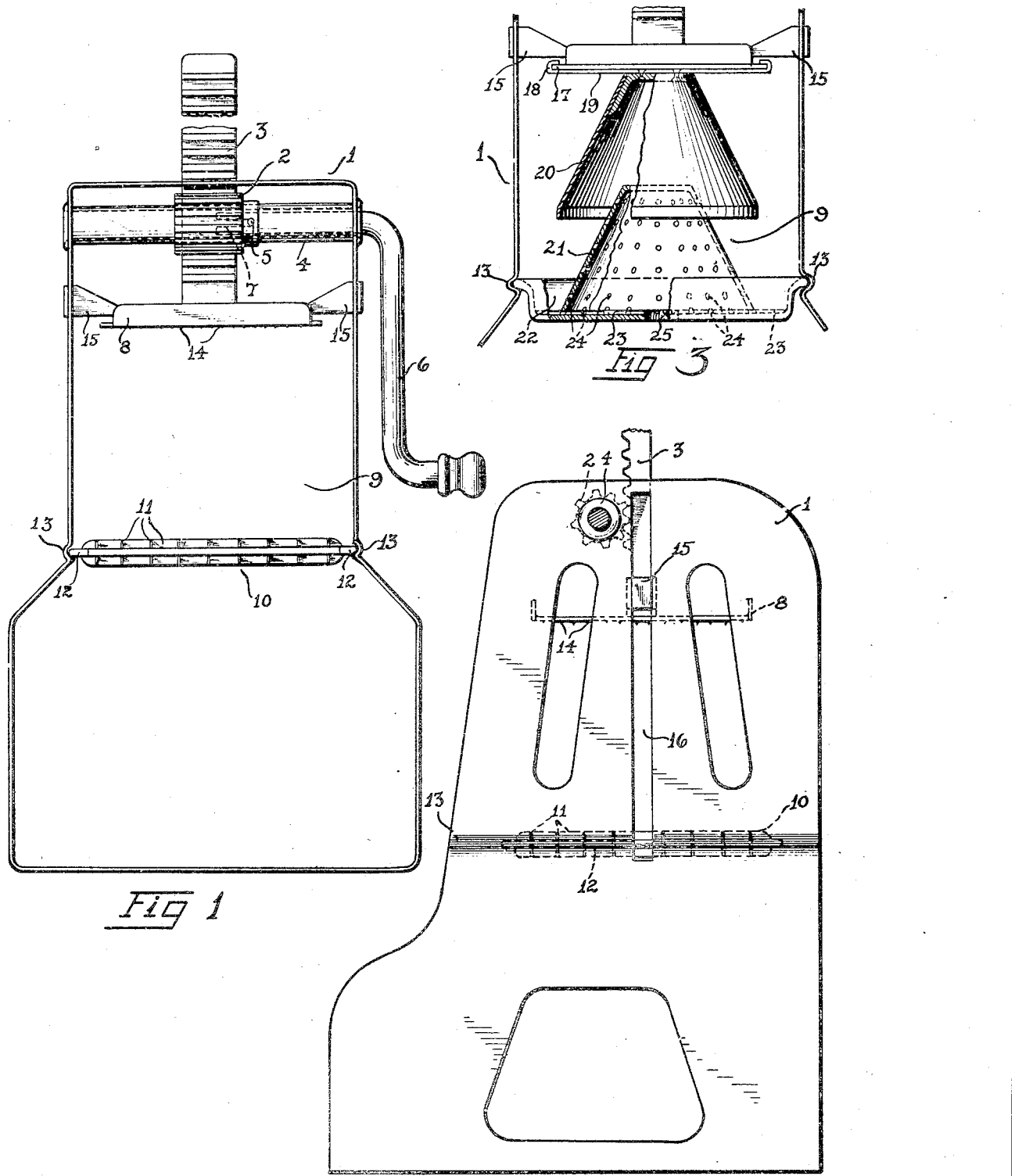

Patented June 4, 1935

2,003,299

UNITED STATES PATENT OFFICE 2,003,299

DEVICE FOR CUTTING AND PRESSING VEGETABLES AND THE LIKE

Harold J. Marlowe, Brooklyn, N. Y., assignor to Marlowe Devices, Inc., a corporation of Delaware Application March 24, 1932, Serial No. 600,854

1 Claims. (Cl. 100—42)

My invention relates to a device for cutting and pressing vegetables, fruits and any relatively soft material. It refers more particularly to a device having interchangeable parts whereby the device can be readily adapted to perform more than one function.

In the commonly known vegetable cutters and other machines in the same class one function is performed by each device. In my invention, however, I have designed not only a means for comfortably and conveniently exerting sufficient pressure for average cutting purposes, but as well, a convenient arrangement for changing and substituting the type of cutting edges and cutting blocks, as, for instance, a butter cutter for a potato slicer. The device is adaptable for squeezing fruits and vegetables also, and interchangeable parts are provided for that purpose.

It is also an object of the invention to provide certain details of construction and arrangement tending to enhance the utility and reliability of a device of this character.

Further objects and advantages will be apparent from the specification and the appended claim.

In the drawing:

Figure 1 is a front elevational view showing one embodiment of my invention.

Figure 2 is a side elevational view, and

Figure 3 is a front elevational fragmentary view delineating a further embodiment of my invention.

Referring to the drawing in detail, frame 1 in Fig. 1 is the structural support of my machine.

A pinion gear 2, meshing with a rack 3, is pinned to hollow shaft 4 by a pin 5 which runs diametrically through the shaft which is journaled in the frame.

A handle 6, having at one end a bifurcation 7 coinciding with the pin 5, offers a substantial means for raising and lowering a pressing block 8 to which the rack is secured, and serves as means for exerting pressure on an element (not shown) in space 9.

A cutting block 10 carries a series of upright cutting edges 11, and is held in a horizontal plane by means of its lateral projections 12 which slide into grooves 13 in frame 1. The underside 14 of the pressing block 8 is roughened to keep element in space 9 from sliding out of position.

Lateral projections 15 on the pressing block 8 slide vertically in slots 16 and act as a guide for said pressing block.

As shown in Fig. 3, the pressing block 8 is provided with laterally extending projections 17 to slidably receive the channel shaped edges 18 of a support 19 to which a cone 20 is secured.

A perforated cone 21 has at its lower periphery a relatively large drain 22 which intersects the outer edge of a series of relatively small radial grooved drains 23 which carry any liquid from the drain 22 through perforations 24 into a central opening 25.

In use the article to be divided is placed between the blocks 8 and 10 and a receptacle (not shown) is arranged underneath the block 10 on the base of the frame. Upon actuation of the handle 6 the block 14 forces the article through the cutter block 10 and the strips are received in the receptacle.

When the article is to be pressed, the embodiment shown in Fig. 3 is used, where the article such as an orange is placed on the cone 21 and the cone 20 is again lowered by actuation of the handle 6.

Attention is called to the fact that the frame is made of a single plate shaped to form a housing in which the various parts are encased. Thus the device is easily assembled for shipment and for use.

While the drawing shows preferred embodiments of the invention, numerous changes and alterations may be made without departing from the spirit of the invention.

I, therefore, do not limit myself to the details of construction as shown, but include all changes constituting departures within the scope of the invention as defined in the appended claim.

I claim:

A device for pressing fruit and vegetables or the like comprising a single sheet of metal bent in the form of an open frame, having a base, side walls and a top portion, a pair of horizontally arranged pressing members, one positioned above the base and sustained in position by means formed integrally with the side walls of the frame, and the other movably mounted above the first and having projections slidably engaging in guide slots likewise formed in the side walls of the frame, and means for operating the movable member to exert pressure upon an object positioned between the pressing members, said means including a shaft journalled in the side walls below the top portion, a pinion carried by the shaft, a rack associated with the movable pressing member and cooperating with the pinion, and a handle for turning the pinion.

HAROLD J. MARLOWE.